United States Patent

[11] 3,621,350

| | | |
|---|---|---|
| [72] | Inventor | John Michael Masterman<br>Churchdown, England |
| [21] | Appl. No. | 834,636 |
| [22] | Filed | June 19, 1969 |
| [45] | Patented | Nov. 16, 1971 |
| [73] | Assignee | Dowty Rotol Limited<br>Gloucester, England |
| [32] | Priority | June 19, 1968 |
| [33] | | Great Britain |
| [31] | | 29,251/68 |

[54] TIME INTEGRAL CONTROL SYSTEM
5 Claims, 5 Drawing Figs.

[52] U.S. Cl. .................................................. 318/171,
318/207 R, 318/231, 318/341
[51] Int. Cl. .................................................. H02p 5/34
[50] Field of Search .................................................. 318/171,
207, 231, 341, 318

[56] References Cited
UNITED STATES PATENTS

| | | | |
|---|---|---|---|
| 2,791,734 | 5/1957 | Kieffert ........................ | 318/231 X |
| 2,896,143 | 7/1959 | Bekey .......................... | 318/231 X |
| 3,159,779 | 12/1964 | Fredrickson ................. | 318/231 X |
| 3,439,246 | 4/1969 | Moritz ......................... | 318/341 X |
| 3,471,763 | 10/1969 | Germann et al. ............. | 318/341 X |
| 3,393,366 | 7/1968 | Shoop .......................... | 318/341 X |

*Primary Examiner*—Gene Z. Rubinson
*Attorney*—Young & Thompson

ABSTRACT: A control system in which an output member is moved in accordance with the time integral of the magnitude and sense of variation relative to its datum of an input signal. The input signal is arranged to control an oscillator means to generate two alternating currents of much greater frequency than the highest frequency of the input signal such that the frequency difference between the alternating currents is in accordance with the magnitude and sense of the input signal. The alternating currents are arranged to drive a synchronous motor means in which an output member is moved at a speed in proportion to the frequency difference between the two alternating currents.

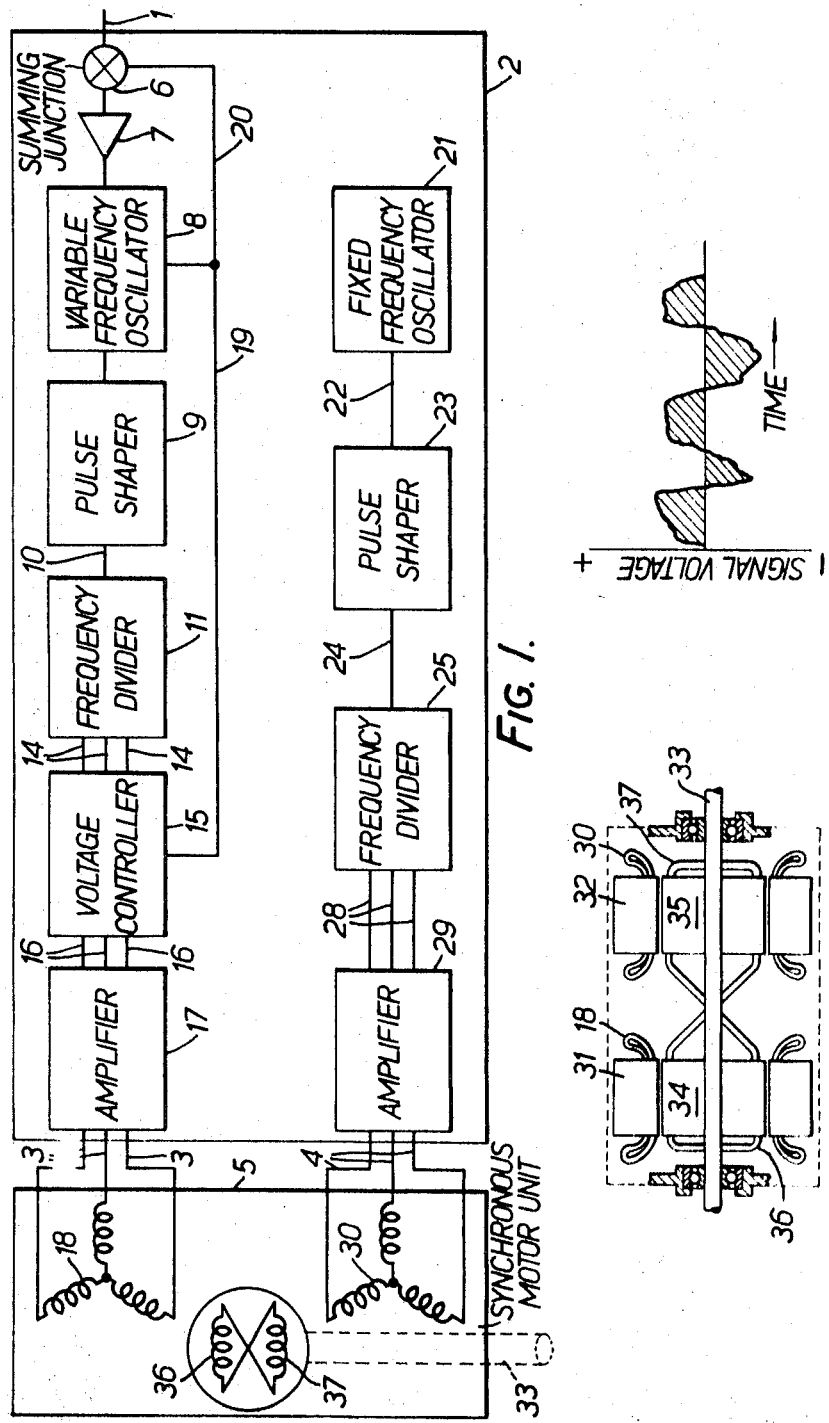

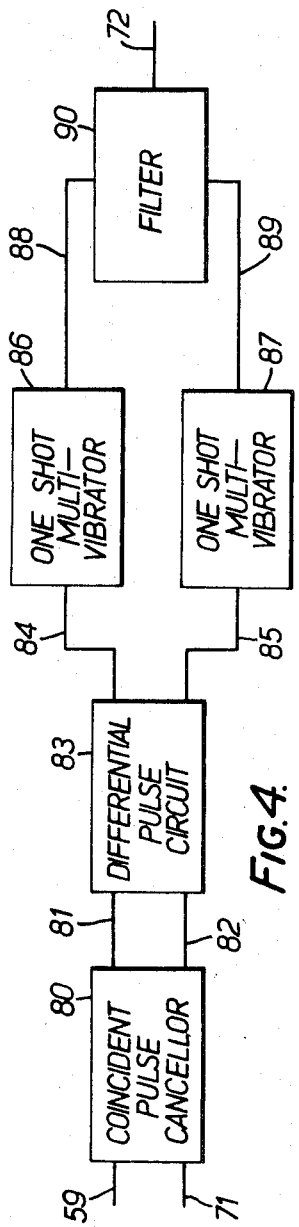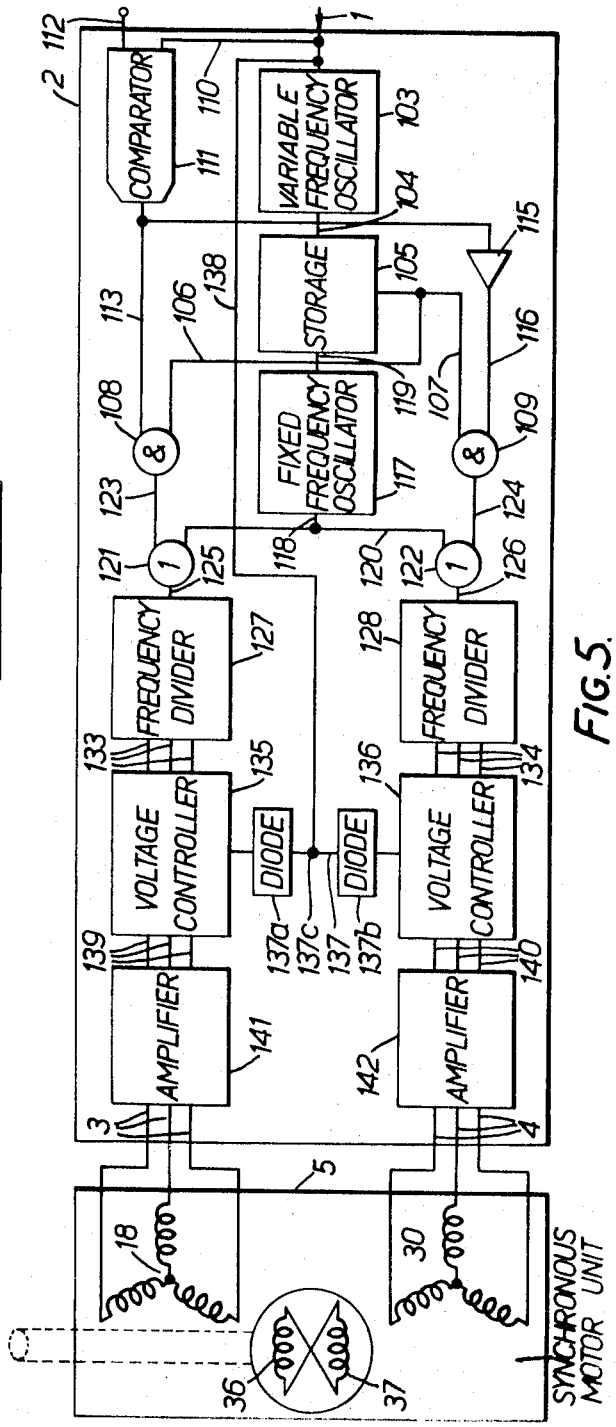

TIME INTEGRAL CONTROL SYSTEM

This invention relates to a control system in which an output member is moved in accordance with the time integral of the magnitude and sense of variation, relative to a datum, of an input signal.

In this control system the present invention comprises oscillator means to generate two alternating currents of much greater frequency than the highest frequency of the input signal and controlled by said input signal such that the frequency difference between the alternating currents is in accordance with the magnitude and sense of the input signal, and synchronous motor means driven by the alternating currents to move the output member at a speed in proportion to the frequency difference between the two alternating currents.

The oscillator means may generate a variable frequency alternating current and a fixed frequency alternating current, the arrangement being that the variable frequency is equal to the fixed frequency when the said input signal is at its datum, the variable frequency increasing or decreasing in accordance with the sense of variation of the input signal from the datum by an amount in accordance with the magnitude of the input signal.

Feedback means may be provided to generate a feedback signal whose magnitude is in proportion to the variable frequency, such feedback signal being arranged to subtract from the input signal to ensure close proportionality between the difference of the two frequencies and the input signal.

Two pulse generators may be provided to generate two pulse trains of fixed and variable frequency which are then converted into the fixed and variable frequency alternating currents. The pulse train frequencies may be reduced proportionally during their conversion to the alternating current frequencies. The alternating currents may be of the three-phase kind.

Alternatively the oscillator means may include a variable frequency pulse train generator where frequency is in proportion to the magnitude of the input signal, a fixed frequency pulse train generator, two amplifiers to deliver the two alternating currents, two frequency dividers each receiving the fixed frequency pulse train, comparator means to compare the input signal with the datum and to add the variable frequency pulse train to the fixed frequency pulse train at one or other divider depending on the sense of the input signal relative to its datum, the outputs of the dividers being connected to the inputs of the amplifiers. For the purpose of the present specification a synchronous motor means is taken to comprise any motor combination having a pair of separate multiphase wound members and at least one rotor secured to an output shaft and capable of rotation at a speed in proportion to the difference of the multiphase supply frequencies connected to the said multiphase windings.

The synchronous motor means may comprise a pair of stators each having a winding, one winding being connected to receive one alternating current and the other winding being connected to receive the other alternating current whereby a rotating magnetic field is generated in each stator in accordance with the frequency of the current fed to it, and a pair of rotors in the stators connected mechanically for rotation together and having windings connected directly to one another such that the said rotors will rotate together at a rate proportional to the difference of the two alternating current frequencies.

Three embodiments of the invention will now be described with reference to the accompanying drawings in which, FIG. 1 is a diagrammatic illustration of one embodiment, FIG. 2 is a diagrammatic illustration of a synchronous motor device for use with FIG. 1, FIG. 3 is a graph illustrating the derivation of the time integral of the input signal, FIG. 4 is a modification for inclusion in the FIG. 1 arrangement, and FIG. 5 is a diagrammatic illustration of another control system.

Reference is made initially to FIG. 1 of the accompanying drawings. In the control system illustrated a single electrical input line 1 is arranged to carry a voltage signal for controlling the output member. This signal may vary slowly between a maximum positive and a maximum negative value about zero voltage as the datum. The signal feeds into an oscillator means located within the area enclosed by line 2. Three-phase alternating current output lines 3 and 4 connect from the oscillator means 2 to a synchronous motor device 5.

The input line 1 on entering the oscillator means 2 connects to a summing junction 6 whose output connects to the input of an amplifier 7. The output of the amplifier is connected to a variable-frequency oscillator 8 arranged to generate sawtooth oscillations of a frequency varying between 300 Hz. and 900 Hz. depending on the voltage carried by the input line 1 from its maximum negative voltage through zero to its maximum positive voltage. Zero voltage on the line 1 will correspond to a frequency of 600 Hz. for oscillator 8. The sawtooth oscillations delivered by oscillator 8 are fed to a pulse-shaper 9 whose function is to convert the sawtooth oscillations into the train of pulses of short duration of the frequency of the sawtooth oscillations. Pulses delivered by pulse shaper 9 are fed through a single line 10 into a frequency divider 11 whose function is to divide the pulse frequency by a factor of twelve. The frequency divider also includes a logic circuit which delivers the divided frequency as a three-phase alternating current output at 50 Hz. The three-phase lines 14 connect to a voltage controller 15 which delivers a three-phase voltage to the line 16 which varies in proportion to frequency. The amplifier 17 delivers a three-phase alternating current through the output lines 3 which connect to a three-phase stator winding 18 forming part of the synchronous motor unit 5.

A line 19 connects an output voltage from the oscillator 8 to the voltage controller 15, the line 19 carrying a signal voltage proportional to frequency for the purpose of enabling the voltage controller to carry out its function. A branch line 20 connects from the line 19 to the summing junction 6.

The oscillator means 2 also includes a fixed frequency oscillator 21 delivering a sawtooth wave form to a single line 22 connecting to a pulse-shaper 23 whose function is to convert the sawtooth oscillations into a train of short duration pulses. The frequency of oscillation of the oscillator 21 is 600 Hz. The line 24 connects to the frequency of divider 25 where the pulse frequency is divided by 12. The frequency divider 25 includes a logic circuit which delivers a three-phase alternating current output at the divided frequency of 50 Hz. The three-phase output 28 from frequency divider 25 feeds into a three-phase power amplifier 29 whose three-phase output 4 is connected to a second three-phase stator winding 30 of the synchronous motor unit 5.

The preferred form of synchronous motor unit is illustrated diagrammatically in FIG. 2. A pair of three-phase stators 31 and 32 are coaxially secured in a side by side arrangement, the stator 31 carrying the three-phase winding 18 and the stator 32 carrying the three-phase winding 30. A rotor shaft 33 mounted appropriately in bearings secured relatively to the stators 31 and 32 carries a pair of rotors 34 and 35. The rotor 34 includes a plurality of windings such as winding 36 formed around it at different angular positions and the rotor 35 includes a similar number of windings 37 also disposed at varying angular positions around it. The windings 36 and 37 are cross-connected together.

In operation of the control system described in FIGS. 1 and 2 a voltage signal obtained from a suitable source is fed into the line 1 to the summing junction 6 at which it is added to a voltage signal fed back from the variable-frequency oscillator 8 so that the input into the amplifier 7 is a function of the sum of the signal voltage on line 1 and the feedback voltage on line 20. The variable-frequency oscillator 8 will deliver a sawtooth output to the pulse-shaper 9 according to the voltage input which it receives from the amplifier 7. Since the output voltage fed to line 20 from oscillator 8 is a voltage proportional to frequency a closed loop is formed which ensures that the frequency delivered by the oscillator 8 is in accordance with the signal fed into line 1, i.e., for a maximum positive voltage on line 1 the frequency will be 900 Hz. for a zero voltage on line 1 the frequency will be 600 Hz. and for a maximum negative voltage on line 1 the frequency will be 300 Hz. The pulse-shaper converts the sawtooth oscillations into pulses which are divided by twelve at divider 11 and converted into a three-phase voltage. The voltage signal fed through line 19 to the voltage controller ensures that the three-phase voltage delivered at the line 16 is in proportion to frequency. The power amplifier 17 delivers three-phase alternating current to the stator winding 18 and the voltage compensation effected by the controller 15 will be such as to ensure that the actual current supplied to the winding 18 is constant irrespective of frequency thus ensuring a constant flux density between stator 31 and rotor 34.

The fixed frequency oscillator 21 generates sawtooth oscillations at 600 Hz. which pass through the pulse-shaper 23, frequency divider 25, and amplifier 29 to emerge as three-phase alternating current fed through the lines 4 to the stator winding 30 at a constant frequency of 600 Hz. Further the arrangement is such that the alternating current flowing in the lines 4 is constant and equal to the alternating current flowing in the lines 3 so that the flux densities between the stators 31 and 32 and their respective rotors are equal.

Within the synchronous motor unit 5 the stator 32 will develop a rotating magnetic field at 50 Hz. and within the stator 31 a rotating magnetic field will also be developed of equal strength to the field in stator 32 and rotating at a rotational frequency in between 25 and 75 Hz. depending on the value of the signal fed to the line 1. The cross-connected windings 36 and 37 of the rotor elements 34 unit 35 ensure that the rotating magnetic fields associated with the two rotors are opposite in direction. The stators are connected so that their rotating fields are each in the same sense as the field of the associated rotor. The rotation of the whole rotor is half the difference of the two rotational speeds of the magnetic fields in the stators 31 and 32. Therefore the rotor shaft 33 will rotate at a speed of between 12½ revolutions per second in the forward direction and 12½ revolutions per second in the reverse direction depending on the value of the input signal fed to the line 1 between a maximum positive voltage and a maximum negative voltage. When the voltage on the line 1 is zero the rotor will be stationary.

The graph in FIG. 3 illustrates by way of example the possible voltage variations of line 1 plotted at the ordinate against time as the abscissa. The zero voltage line is the datum and the algebraic sum of the areas enclosed between the graph and the datum line is the time integral of the magnitude and sense of variation of the signal relative to the datum. The total rotation effected by the rotor of the synchronous motor nuit will be in proportion to this time integral.

Reference is now made to FIG. 4 of the accompanying drawings which shows a modification for substitution in FIG. 1. The purpose of the FIG. 4 arrangement is to provide a more accurate feedback system to ensure that the actual frequency difference between the variable-frequency oscillator 8 and the fixed frequency oscillator 21 is in proportion to the input signal fed to the line 1. The lines 59 and 71 extend from the lines 10 and 24 of FIG. 1 and transmit the pulse outputs of the pulse-shapers 9 and 23 into a coincident pulse canceller 80. The canceller 80 has two output lines 81 and 82 and normally the pulses on lines 59 and 71 will be transmitted respectively to the lines 81 and 82 except in the case where the pulses arriving on lines 59 and 71 are coincident when there will be no output from the lines 81 and 82. The differential pulse circuit 83 is a conventionally designed logic gate which gives an output to either of the two DC voltage 84 and 85 depending on the pulse frequency difference arriving at the input lines 81 and 82. If the pulse frequency in line 81 is greater than in line 82 line 84 will receive a pulse frequency output equal to the difference of the input pulse frequencies. If the pulse frequency in line 82 is greater than in the line 81 the line 85 will receive a pulse frequency equal to the difference of the pulse rates in the lines 81 and 82. If the pulse frequencies in the lines 81 and 82 are equal there will be no output in either of the two lines 84 and 85. The lines 84 and 85 connect respectively to one shot multivibrators 86 and 87. The outputs from the one shot multivibrators pass along the lines 88 and 89, the pulses in line 88 being positive and those in line 89 being negative, and of the frequencies respectively fed in through the lines 84 and 85. The widths of the pulses are constant and independent of frequency. At the filter unit 90 the voltages are filtered to remove high frequencies and added together so that line 72 receives a smooth DC voltage which is either positive or negative depending on the sense of the frequency difference fed into the lines 59 and 71. The line 72 connects back in place of the line 20 into the summing junction 6 of FIG. 1. This arrangement operates with higher accuracy than the FIG. 1 arrangement to ensure that the pulse frequency difference generated by the variable-frequency oscillator 8 and fixed frequency oscillator 21 is as near as possible directly proportional to the magnitude and sense of the voltage fed on to the line 1. The method of operation is otherwise exactly as described with reference to FIG. 1.

Reference is now made to FIG. 5 of the accompanying drawings which shows generally an oscillator means 2 in connection with a synchronous motor unit 5 identical with the synchronous motor unit 5 of FIG. 1. The oscillator means 2 has a single input line 1 which carries the slowly varying input voltage. The line 1 connects to a variable-frequency oscillator 103 which in this instance is a relaxation oscillator generating a pulse output whose frequency is directly proportional to the magnitude only of the input signal. The output line 104 connects to a storage circuit 105 having a pair of output lines 106 and 107 connected to one another. The lines 106 and 107 form respectively the first inputs to two AND-gates 108 and 109.

The input line 1 is also connected through a line 110 to a comparator 111 having a reference input line 112. The function of the comparator is to detect the sense of the input signal applied to the line 1 and to compare it with a datum voltage fed to the line 112 which in this instance is zero voltage. The output line 113 from the comparator 111 forms the second input of the AND-gate 108 and of the AND-gate 109. The line 114 connects to AND-gate 109 through a logic inverter 115 and line 116.

A fixed frequency oscillator 117 is provided having two outputs 118 and 119 both carrying the pulse oscillations. The first line 118 connects into a line 120 which itself connects to a pair of OR-gate 121 and 122. The line 119 connects back to the storage circuit 105.

Two lines 123 and 124 are respectively taken from the AND-gates 108 and 109 to form respectively second inputs to the OR-gates 121 and 122.

The output lines 125 and 126 from the counters respectively connect with frequency dividers 127 and 128 which include the logic circuits to convert the reduced frequency into three-phase voltage. The three-phase outputs 133 and 134 from the dividers enter a pair of voltage controllers 135 and 136 respectively. The voltage controllers 135 and 136 are connected together by lines 137 and 138 back to the input line 1. The line 137 includes a pair of diodes 137a and 137b positioned on either side of the junction 137c with a line 138. The three-phase outputs 139 and 140 from the voltage controllers 135 and 136 enter power amplifiers 141 and 142 giving three-phase alternating currents which are fed respectively to the stator windings 18 and 30 of the synchronous motor units through lines 3 and 4.

In operation the controlling input signal is fed through line 1 to the variable-frequency oscillator 103 which gives a pulse-frequency output to the line 104 at a frequency proportional to the magnitude only of the voltage applied in line 1.

The input signal from line 1 is also fed to the comparator 111 for comparison with a datum voltage (in this case zero voltage) fed from the line 112. The output from comparator 111 is a logic "1" or "0" signal depending on whether the sense of the input signal is positive or negative. IF the comparator 111 gives a "1" signal this will cooperate with the pulses received at the AND-gate 108 from the storage unit 105 to cause the delivery from the AND-gate 123 to carry a series of pulses at the frequency delivered by variable oscillator 103 through storage unit 105. Alternatively if the input signal is negative the comparator 111 will deliver a logic "0" which will not be capable of operating AND-gate 108 but on passing through inverter 115 will supply a logic "1" into AND-gate 109 which will then deliver pulses at the frequency delivered from storage unit 105 to its delivery line 124.

The fixed frequency oscillator is connected through line 119 to the storage unit 105 and the operation of the storage unit is such that if two pulses arrive simultaneously from oscillators 103 and 117 there will be no delivery from storage unit 105 but immediately the simultaneous pulses terminate, storage unit 105 will deliver a pulse to lines 106 and 107 in resetting itself. Thus the number of pulses delivered to lines 106 and 107 is equal to the number of pulses generated by oscillator 103. Fixed frequency oscillator 117 is also connected through lines 118 and 120 into the two OR-gates 121 and 122. The OR-gate 121 will therefore receive pulses from the fixed frequency oscillator and pulses from AND-gate 108 if the input signal is positive. The function of the OR gate is to deliver pulses to its output 125 equal in number to the total pulses received from lines 120 and 123 although the pulses received from lines 120 and 123 will not be equally spaced. The operation of storage unit 105 ensures that coincident pulses are not fed through lines 120 and 123 and therefore the pulse frequency delivered at line 125 will be equal to the sum of the frequencies delivered by oscillators 103 and 117 although with nonuniform spacing between the pulses. The function of the OR-gate 122 is similar to the OR-gate 121 except that pulses are fed through AND-gate 109 and line 124 only when the input signal on line 1 is negative. The delivery from the OR-gate 126 will be equal to the pulses fed jointly from the lines 120 and 124. When either of the AND-gates 108 and 109 is not operative the associated OR-gate 121 or 122 will deliver only the pulse frequency fed from the line 120.

The pulse frequency delivered by oscillator 117 is 43.2 kHz. and the frequency delivered by oscillator 103 lies between zero and 22.6 kHz. for variation of the input signal on line 1 from zero either to positive or negative maximum. The frequency divider 127 will divide the frequency received from line 127 by a factor of 864 and the reduced frequency will be delivered as a three-phase voltage, Assuming that the input signal is zero frequency divider 127 will deliver three-phase current at 50 Hz. into the voltage controller 135. The input signal is fed by line 138 through junction 137c and rectifier 137a into the voltage controller 135 and will operate to cause the voltage controller to modify the three-phase voltage if the input signal is positive. If the input signal is negative rectifier 137a will not carry the voltage signal to the controller. From the controller 135 the three-phase voltage passes through lines 139 to power amplifier 141 and thence through lines 3 to the stator 18 of the synchronous motor unit 5.

The pulse frequency delivered to line 126 from OR-gate 122 will similarly be divided at divider 128 by a factor of 864 and converted into a three-phase voltage. Again assuming the input signal is zero the three-phase voltage carried by lines 134 will be at 50 Hz. This three-phase voltage enters the voltage controller 136 and will be modified by voltage fed from the input 1 through rectifier 137b if the input signal is negative. From controller 136 the three-phase voltage passes through lines 140 to power amplifier 142 and thence through lines 4 to the stator 30. The cross-connected rotor as described with reference to FIG. 2 will rotate at a speed equal to half the frequency difference fed to the two stators. The voltage controllers 135 and 136 will operate to ensure constant current in the output lines 3 and 4 irrespectively of the frequencies fed into the stator windings. If the input signal on line 1 is positive the alternating current fed to stator winding 30 will have the greater frequency and the rotor will rotate in one direction at a rate equal to one half of the frequency difference. This frequency difference is proportional to the frequency generated by the variable frequency oscillator 103. If the input signal is negative the alternating current fed to stator 146 will have the higher frequency and the rotor will rotate in the other direction at a speed equivalent to half the frequency difference The frequency difference of the alternating currents fed to the two stators will again be proportional to the frequency generated by the variable oscillator 103. As described with reference to FIGS. 1, 2 and 3 the rotor will rotate at half the frequency difference of the alternating currents and total rotation of the rotor will be in proportion to the time integral of the magnitude and sense of the variation relative to the datum of the input signal fed to line 1. The accuracy of control obtainable in this embodiment is in substantial measure due to the high frequencies selected for the fixed and variable frequency oscillators and the frequency division. This is due to the fact that the method of adding the variable and fixed frequency pulses at each counter makes it impossible to rely on the relative phasing of the pulses to contribute to accurate control. In the FIG. 1 embodiment the fixed and variable pulse frequencies are considerably lower but accuracy in control is maintained because it is possible to rely on the relative phasing of the pulses of the fixed and variable frequency oscillators as well as on their frequency.

The invention is particularly applicable to a closed loop servo system in which a movable member controlled by rotor 147 whose position is to be controlled, generates a positive or negative feedback signal in accordance with the error in its position which is fed to the input line 1.

The invention is not limited to the use of three-phase alternating currents for driving the synchronous motor unit and, for example, two-phase currents may be employed. The invention is further not limited to the kind of synchronous motor unit employed provided that its speed of rotation is proportional to the frequency difference of the two alternating currents. For example, the synchronous motor unit may comprise a three-phase stator receiving one alternating current and a three-phase rotor receiving the other alternating current through slip rings, the arrangement being such that the rotor rotates at the difference of the two alternating current frequencies. Again two quite separate synchronous motors may be provided fed with the three-phase alternating currents deliveries, the outputs of the synchronous motors being connected to a differential gear whose output in turn is arranged to be in accordance with the difference of the rotational speeds of the two motors.

I claim:

1. A control system in which an output member is moved in accordance with the time integral of magnitude and sense of variation, relative to a datum, of an input signal, comprising oscillator means to generate a variable frequency multiphase alternating current and a fixed frequency multiphase alternating current both of much greater frequency than the highest frequency of the input signal and controlled by said input signal such that the variable frequency is equal to the fixed frequency when the input signal is at its datum, the variable frequency increasing or decreasing in accordance with the sense of variation of the input signal from the datum by an amount in accordance with the magnitude of variation of the input signal from the datum, synchronous motor means driven by the alternating currents to move the output member at a speed in proportion to the frequency difference between the two multiphase alternating currents, feedback means generating a feedback signal of magnitude in proportion to the frequency of the variable frequency alternating current, and a feedback connection arranged to subtract the feedback signal from the input signal so as to ensure close proportionality between the difference of the two alternating current frequencies and the input signal.

2. A control system in which an output member is moved in accordance with the time integral of magnitude and sense of variation relative to a datum of an input signal, comprising oscillator means having two pulse generators to generate two pulse trains, one of fixed frequency and one of variable frequency such that the variable frequency is equal to the fixed frequency when the input signal is at its datum, the variable frequency increasing or decreasing in accordance with the sense of variation of the input signal from the datum by an amount in accordance with the magnitude of variation of the input signal from the datum, two frequency dividers operative one on each pulse train to reduce the pulse frequencies and to convert then into fixed frequency and variable frequency multiphase alternating currents of which the pulse frequencies are fixed multiples, and synchronous motor means driven by the alternating currents to move the output member at a speed in proportion to the frequency difference between the two alternating currents.

3. A control system as claimed in claim 1 where the frequency dividers include two logic circuits operative to deliver the divided pulse frequencies as alternating currents of the three-phase kind.

4. A control system in which an output member is moved in accordance with the time integral of magnitude and sense of variation relative to a datum of an input signal, comprising oscillator means having a variable frequency pulse train generator whose frequency is in accordance with the magnitude of the input signal, a fixed frequency pulse train generator, two frequency dividers each receiving the fixed frequency pulse train, comparator means to compare the input signal with the datum and to add the variable frequency pulse train to the fixed frequency pulse train at one or other frequency divider depending on the sense of the input signal relative to its datum, two amplifiers connected to receive the outputs of the frequency dividers and to deliver two-multiphase alternating currents of frequencies corresponding to the input pulse frequencies and synchronous motor means driven by the alternating currents to move the output member at a speed in proportion to the frequency difference between the two alternating currents.

5. A control system as claimed in claim 2 wherein the dividers include two logic circuits operative one on each divided pulse frequency to convert them into alternating currents of the three-phase kind.

* * * * *